(12) United States Patent
Lopetrone

(10) Patent No.: US 9,372,278 B2
(45) Date of Patent: Jun. 21, 2016

(54) LIGHT-BASED POSITION CONTROL OF A MANUAL PICKING PROCESS

(71) Applicant: Fives Inc., Farmington Hills, MI (US)

(72) Inventor: John A. Lopetrone, Canton, MI (US)

(73) Assignee: Fives Inc., Farmington Hills, MI (US)

( * ) Notice: Subject to any disclaimer, the term of this patent is extended or adjusted under 35 U.S.C. 154(b) by 280 days.

(21) Appl. No.: 14/291,576

(22) Filed: May 30, 2014

(65) Prior Publication Data

US 2015/0346383 A1 Dec. 3, 2015

(51) Int. Cl.
*G01B 11/14* (2006.01)
*G01V 8/26* (2006.01)
*G05B 23/02* (2006.01)
*B23P 21/00* (2006.01)

(52) U.S. Cl.
CPC ............... *G01V 8/26* (2013.01); *B23P 21/002* (2013.01); *G05B 23/0254* (2013.01); *G05B 2219/31027* (2013.01); *Y02P 90/04* (2015.11)

(58) Field of Classification Search
CPC combination set(s) only.
See application file for complete search history.

(56) References Cited

U.S. PATENT DOCUMENTS

| 6,753,776 B2 | 6/2004 | Drinkard |
| 2014/0007419 A1 | 1/2014 | De Martin |
| 2014/0083058 A1 | 3/2014 | Issing et al. |

FOREIGN PATENT DOCUMENTS

WO 2012109593 A1 8/2012

*Primary Examiner* — Tri T Ton
(74) *Attorney, Agent, or Firm* — Quinn Law Group, PLLC

(57) ABSTRACT

A position control system for a manual picking workstation having a plurality of component bins includes a light device and a process controller. The light device projects a light beam along a plane. The process controller includes a processor and memory containing a calibrated assembly sequence and predetermined bin coordinates for each of the component bins. The process controller executes a method to detect, via the light device, an instance of beam breakage wherein the light beam is interrupted or broken, and to determine two-dimensional (2D) coordinates of the beam breakage. The process controller also determines corresponding bin coordinates of an expected bin via the calibrated assembly sequence, compares the determined 2D coordinates to the corresponding bin coordinates, and executes a control action when the determined coordinates do not match the corresponding bin coordinates. The light device may be an oscillating laser scanner or fixed lasers.

20 Claims, 2 Drawing Sheets

US 9,372,278 B2

LIGHT-BASED POSITION CONTROL OF A MANUAL PICKING PROCESS

TECHNICAL FIELD

The present disclosure pertains to light-based position control of a manual picking process.

BACKGROUND

The term "picking" as used in manufacturing refers to the process of locating a component bin, extracting a component from the located component bin, and then moving the extracted component to a designated work surface for kitting, assembly, or other processing steps. The design of a workstation having the designated work surface may be relatively simple or elaborate depending on the processing task. For example, in a relatively simple manual workstation, a human operator may be positioned at a table equipped with any necessary assembly tools and one or more tiers of component bins. Using such a layout, the operator is able to easily reach the required component bins and perform a required processing task with increased economy of motion.

SUMMARY

A system and method are described herein that use light-based position control in a manual picking process of the type described above. Unlike in fully-automated picking processes that closely control the sequential movement of a picking robot to minimize position error, manual picking processes are more prone to variance, for instance between different operators or at different times with respect to the same operator. The present invention is intended to provide a highly repeatable quality level in such manual picking processes.

The system employs light-based position control steps and associated structural elements to ensure that an operator performs manual picking steps in a correct or expected order relative to a calibrated picking sequence. To accomplish this goal, a light device is positioned with respect to the workstation. The light device projects one or more light beams in or along a fixed plane between the operator and a set of component bins, which are typically open-top boxes arranged in rows and columns within easy reach of the operator. The plane is divided into a two-dimensional (2D) grid in logic of a process controller, with each segment or pixel of the 2D grid having a corresponding pair of coordinates, for instance XY coordinates in an example XYZ Cartesian frame of reference.

Whenever the operator interrupts or breaks one or more of the light beams in the plane while reaching for a component in one of the component bins, the coordinates of the broken light beam(s) are automatically detected via the light device and process controller. The process controller, which is programmed with a calibrated picking sequence defining a predetermined order of bin picking steps, each with a corresponding correct or "expected" component bin, may command an audio, visual, and/or tactile indication in response to the broken light beam(s). The nature of the indication depends on the location of the light beam breakage and the intended design.

For example, when the operator attempts to access an incorrect or unexpected component bin, again as determined by the process controller via comparison to the calibrated sequence, an indicator device positioned within view of the operator or on the operator's person may activate. An example lamp may illuminate in red or another suitable color, an audible alarm may sound, and/or a tactile response may be activated. Likewise, a text message may be displayed via a display screen alerting the operator that an incorrect bin access was attempted. The same display screen may be used to cue the operator as to the location of the expected component bin for a given part of the calibrated sequence, or other cueing approaches may be used such as individual prompting lamps located on or within each of the component bins. The process controller may be optionally programmed to record and track the efficiency of a given operator, with such efficiency data being useful for operator training, as well as for process or layout evaluation.

In an example embodiment, the system includes the process controller, the display screen, and the light device. The light device is positioned with respect to the component bins, for instance directly overhead of the operator in an example laser scanner embodiment as detailed herein. The light device projects one or more light beams in or along a fixed plane between the operator and the component bins. The process controller, which is in communication with both the light device and the display screen, may display part of a calibrated picking sequence via the display screen so as to cue the operator as to the correct next step in the picking process.

In all embodiments, the light device and process controller are operable for detecting which light beams emitted by the light device are interrupted or broken, and for determining the corresponding 2D coordinates of the beam breakage(s). The plane is divided into a virtual grid of segments or pixels, with each pixel having corresponding 2D coordinates that are matched to the calibrated sequence by the process controller to determine the "correctness" of the particular picking movement causing the beam breakage.

After identifying the 2D coordinates of the beam breakage(s), the process controller matches the identified 2D coordinates of the beam breakage(s) to corresponding boundaries of an expected component bin, again as determined by the calibrated sequence. If the location of the beam breakage(s) indicates that the operator is working within a permitted distance of the expected component bin, the process controller may execute a suitable control action such as illuminating an indicator device and/or presenting a message via the display screen. If the two do not match, i.e., if the beam breakage(s) indicate that the operator is not within the permitted distance of the expected component bin, the process controller may execute another suitable control action such as illuminating the indicator device in a different manner, such as illuminating a red light, and/or presenting a message on the display screen or one of the component binds prompting the operator to the expected component bin.

A method is also disclosed for controlling a position control system for a manual picking workstation having a plurality of component bins. The method according to an example embodiment includes providing a calibrated assembly sequence and predetermined bin coordinates for each of the plurality of component bins, and projecting a light beam in or along a plane via a light device. The method also includes detecting, via a process controller and the light device, an instance of beam breakage wherein the light beam is interrupted or broken, detecting two-dimensional (2D) coordinates of the beam breakage, and determining corresponding bin coordinates of an expected bin via the calibrated assembly sequence. Additionally, the process controller compares the determined 2D coordinates of the beam breakage to the corresponding bin coordinates of the expected bin, and executes a control action with respect to the manual picking workstation via the process controller when the determined 2D coordinates of the beam breakage do not match the corresponding bin coordinates of the expected bin.

The above features and advantages and other features and advantages of the present invention are readily apparent from the following detailed description of the best modes for carrying out the invention when taken in connection with the accompanying drawings.

DETAILED DESCRIPTION

Figure 1:
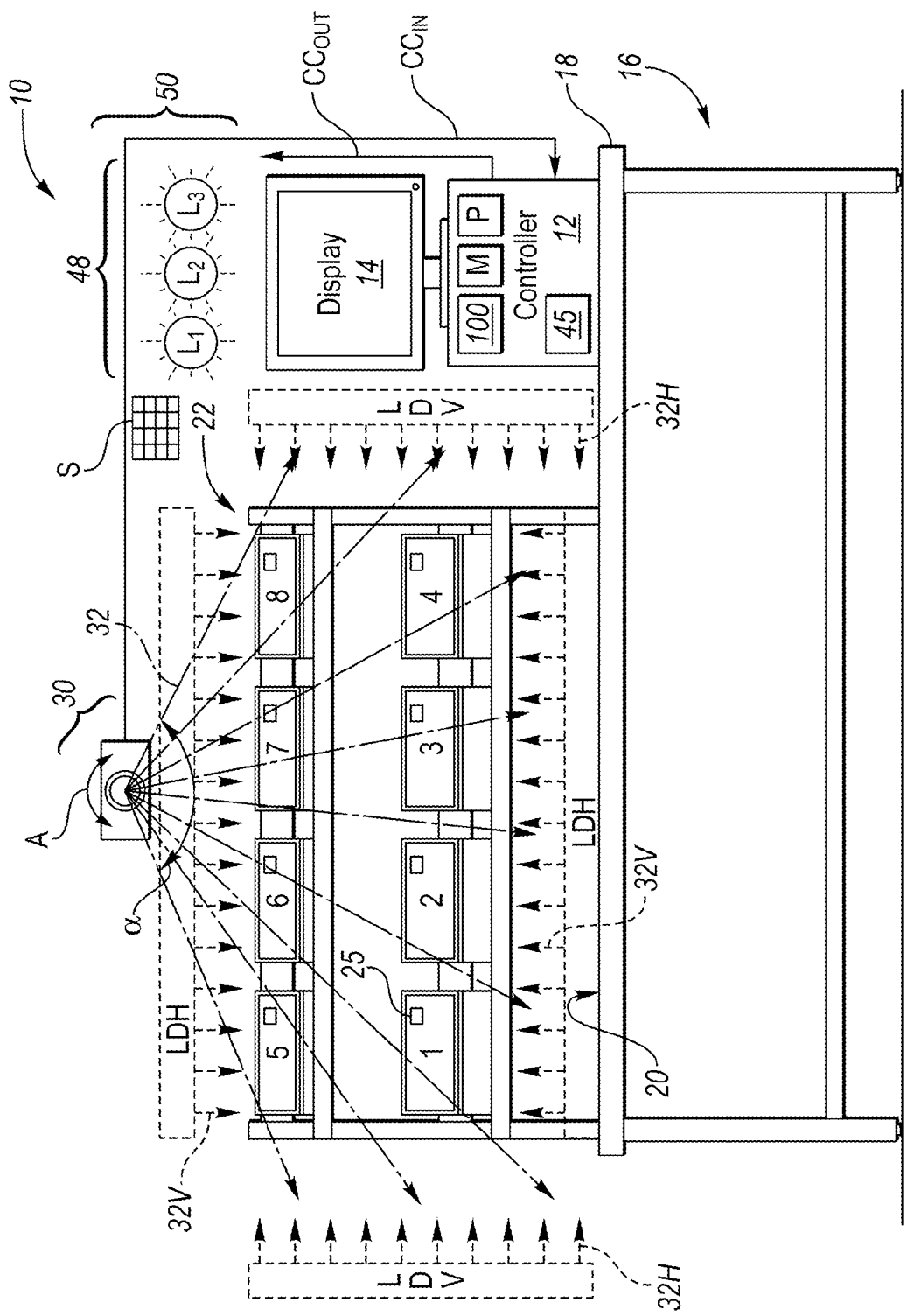
FIG. 1 is a schematic perspective front view illustration of a manual picking and assembly workstation having a light-based position control system as described herein.
Figure 2:
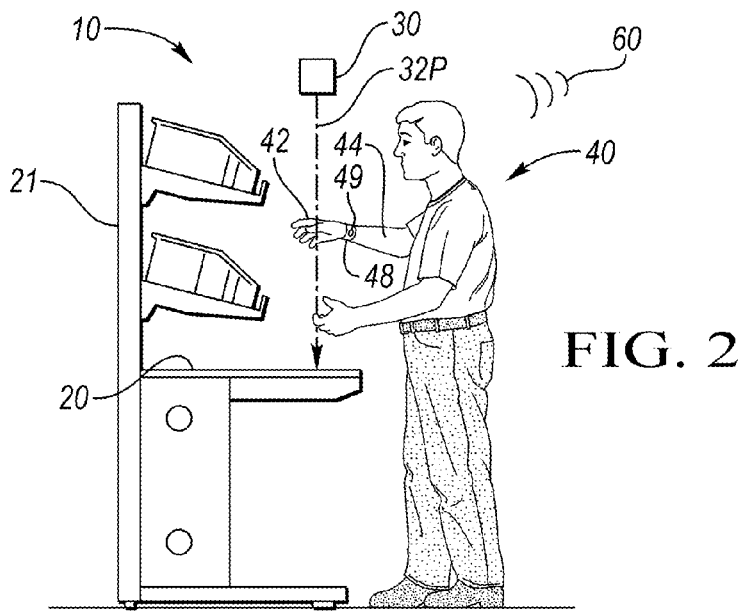
FIG. 2 is a schematic perspective side view illustration of the manual picking and assembly workstation shown in FIG. 1.

Referring to the drawings wherein like reference numbers correspond to like or similar components throughout the several figures, a manual picking and assembly workstation 10 is shown schematically in FIGS. 1 and 2. As best shown in FIG. 1, the workstation 10 may include a process controller 12, a display screen 14, and a table 16 having a tabletop 18. The tabletop 18 includes a work surface 20, e.g., a horizontal surface suitable for use by a human operator, shown at 40 in FIG. 2, in assembling a subsystem or performing a kitting operation, as is well known in the art.

The workstation 10 includes a plurality of component bins 22 arranged with respect to the operator 40. The component bins 22 may be connected to a vertical rack 21 as best shown in FIG. 2, with the components bins 22 numbered sequentially in FIG. 1 for clarity with numerals 1-8. Any number and style of component bins 22 may be used, provided the component bins 22 are positioned sufficiently facing or opening toward the operator 40 in easy reach of the operator 40. In an optional embodiment, each of the component bins 22 may include a prompting lamp 25 such as an LED or incandescent bulb, with the function of the optional prompting lamp 25 described below.

The workstation 10 includes a system 50 that employs light-based position control to help ensure that the component bins 22 are accessed by the operator 40 of FIG. 2 in a correct/expected order relative to a calibrated picking sequence 45. The calibrated picking sequence 45 is a predetermined series of steps in a given picking process. For example, when creating an example parts kit using components from the various component bins 22, the calibrated sequence 45 may be "4, 8, 7, 2, 2, 5" to indicate that bins 4, 8, and 7 are accessed sequentially, followed by two accesses of bin 2, followed by an access of bin 5. In such an example, the sequence "4, 8, 7, 2, 2, 5" is a correct or expected order of the component bins 22. The calibrated picking sequence 45 may be programmed into memory (M) of the process controller 12, and thus readily accessed by a processor (P) of the process controller 12 in executing the method 100.

Key to proper operation of the system 50 of FIGS. 1 and 2 is the use of a light device 30. The light device 30, which is positioned with respect to the component bins 22, projects one or more light beams 32, whether visible or invisible to the naked eye, in or along a plane 32P located between the operator 40 and the component bins 22, with the plane 32P shown schematically in FIG. 2. As described below with reference to FIG. 3, the plane 32P is divided in logic of the process controller 12 into a virtual grid 52, with each segment or pixel of the grid 52 having a corresponding 2D coordinate pair, e.g., XY coordinates in an example XYZ Cartesian frame of reference. The process controller 12 is programmed to execute instructions embodying a method 100, an example of which is shown in FIG. 4, to provide the light-based position control noted above.

The light device 30 of FIGS. 1 and 2 may be embodied as a laser scanner in a particular embodiment. When so configured, the light device 30 is operable to continuously oscillate, i.e., rotate back and forth within a fixed detection angle ($\alpha$) as indicated by double-headed arrow A, so as to project one or more light beams 32 in the plane 32P. Commercially available embodiments exist in the form of laser scanners, which are more typically used for generating light curtains or light planes to demarcate fixed limits or boundaries around manufacturing machines or other access-protected devices or locations within a manufacturing facility. One possible example suitable for use as the light device 30 is the OS32C Safety Laser Scanner offered commercially by OMRON Scientific Technologies, Inc.

The light device 30 may be configured as any relatively low-power design providing a sufficiently wide detection angle ($\alpha$), for instance 180°-270°. As the light device 30 in this embodiment is positioned directly overhead with respect to the operator 40 shown in FIG. 2, other detection angles ($\alpha$) may be used within the scope of the invention, provided that sufficient coverage is given to the component bins 22. In other words, as viewed from the perspective of FIG. 1, the light beams 32 must pass between the operator 40 and all of the component bins 22 whose access is being monitored, thereby providing the sufficient coverage. The resolution of the light device 30 should be sufficiently high for precisely detecting the location of breakage of the plane 32P by a hand 42 and/or forearm 44 of the operator 40, such as 50-100 mm in an example embodiment.

In another possible embodiment, the light device 30 shown in FIGS. 1 and 2 may be a set of fixed/non-oscillating horizontal and vertical linear light curtain devices LDV and LDH, respectively, as shown in phantom in FIG. 1. Such an embodiment may be used to project and receive horizontal light beams 32H and vertical light beams 32V. Thus, in lieu of an oscillating safety laser scanner embodiment as described above, stationary laser projector devices may be used to project the light beams 32H, 32V. In this alternative embodiment, as will be appreciated by those having ordinary skill in the art, one light curtain device LDV projects while the oppositely-positioned device LDV receives. The same projecting-receiving pairing holds true for the horizontal devices LDH.

The process controller 12 of FIG. 1 may be configured as a microprocessor-based device having such common elements as the processor (P) and memory (M). The memory (M) includes read only memory (ROM), random access memory (RAM), electrically-programmable read-only memory (EPROM), etc., and any required electronic circuitry, including but not limited to a high-speed clock (not shown), analog-to-digital (A/D) circuitry, digital-to-analog (D/A) circuitry, a digital signal processor, and the necessary input/output (I/O) devices and other signal conditioning and/or buffer circuitry. The process controller 12 may be optionally programmed to record and track the efficiency of a given operator, with such efficiency data being useful for operator training, as well as for process or layout evaluation.

The system 50 may optionally include one or more indicator devices 48, e.g., a plurality of state lamps $L_1$, $L_2$, $L_3$ and/or an audio speaker S, with each state lamp $L_1$, $L_2$, $L_3$ being of a different color such as green, amber, and red, respectively. If a single state lamp $L_1$, $L_2$, or $L_3$ is used, a color-changing lens may be used to provide the same end effect. The indicator devices 48, the light device 30, and the display screen 14 are all in communication with the process controller 12, with the process controller receiving input signals (arrows $CC_{IN}$) from the light device 30 and providing output signals (arrow $CC_{OUT}$) to the display screen 14 and/or the indicator devices 48 as needed.

Whenever the operator 40 of FIG. 2 breaks the plane 32P, the 2D coordinates of the location of such breakage of the light beam(s) 32 are detected by the light device 30 and transmitted to the process controller 12 as part of the input signals (arrows $CC_{IN}$). Software of the light device 30 needed for detecting such breakage may reside in the process controller 12, and if so, transmission of the input signals (arrows $CC_{IN}$) occurs within the process controller 12. The process controller 12 is programmed with the calibrated sequence 45 defining the correct steps in a given bin picking process. The process controller 12 therefore receives the input signals (arrow $CC_{IN}$) from the light device 30, for instance via a network bus or wirelessly, processes the received input signals (arrow $CC_{IN}$) in conjunction with the calibrated sequence 45, and then commands a suitable audio and/or visual response as needed via activation of indicator devices 48 via the output signals (arrow $CC_{OUT}$) in response to breakage of the light beams 32 forming the plane 32P. The process controller 12 may also display a message via the display screen 14 using the same output signals (arrow $CC_{OUT}$).

In an optional embodiment, the indicator device(s) 48 may include a tactile device 48 having a receiver 49, for instance a wrist band as shown or a badge worn by the operator 40. The process controller 12 may transmit wireless signals 60 to the receiver 49 as part the output signals (arrow $CC_{OUT}$), with receipt of the wireless signals 60 causing the tactile device 48 to activate a tactile device, e.g., to vibrate. In such an embodiment, the operator 40 need not be looking at the display screen 14 or at the state lamps $L_1$, $L_2$, and $L_3$ to receive feedback that the operator 40 has attempted to access an incorrect component bin 22. Tactile feedback is immediately perceived by the operator 40 via operation of the tactile device 48, such as vibration provided via a small bell and electromagnet assembly as is well known in the art. Such tactile feedback can be used to prompt the operator 40 to look at the display screen 14 and/or the optional prompting lamps 25 for guidance as to the expected component bin 22.

Figure 3:
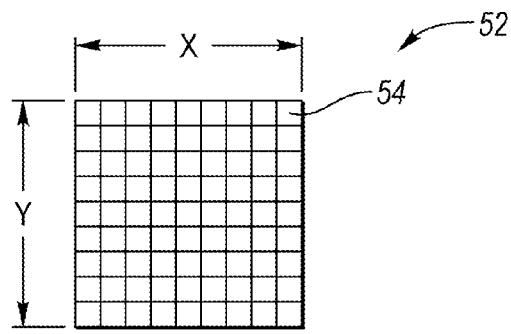
FIG. 3 is a schematic illustration of a grid that is used by the light-based position control system of FIG. 1.
Figure 4:
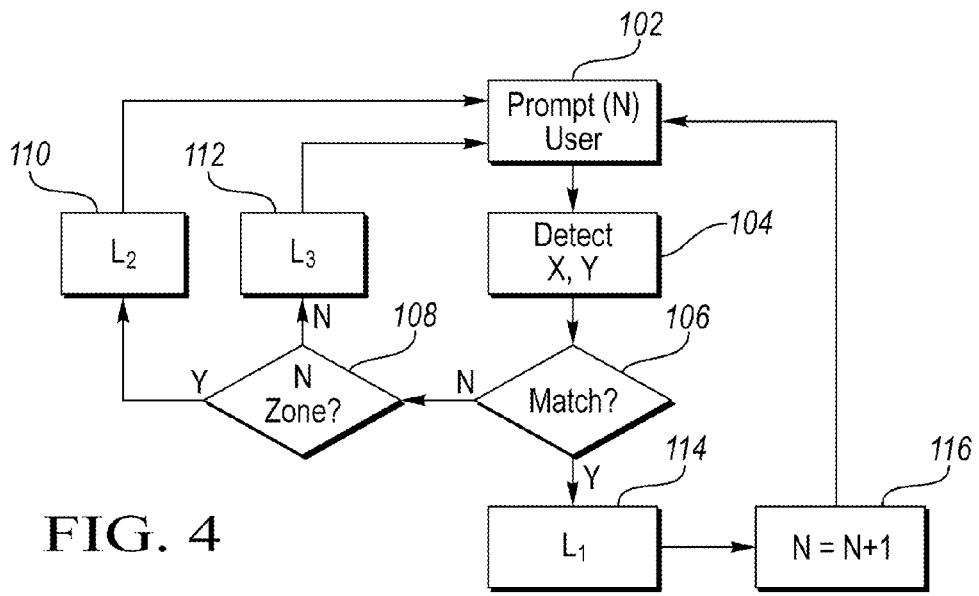
FIG. 4 is a flow chart describing an example method for use in the manual picking and assembly workstation shown in FIGS. 1 and 2.

Referring briefly to FIG. 3, the nature of the indication to the operator 40 depends on the location of any breakages of the light beams 32 of FIGS. 1 and 2. To that end, the process controller 12 is programmed to pre-associate a given area of the component bins 22 with the grid 52 as shown. Each pixel 54 of the grid 52 has corresponding 2D coordinates, for instance X and Y dimensions, within a calibrated resolution as noted above. For example, when the operator 40 attempts to access an incorrect component bin 22, such as by reaching toward bin 1 of FIG. 2 instead of bin 5, one of the state lamps $L_1$, $L_2$, or $L_3$ positioned within view of the operator 40 may illuminate in red or another suitable color, an audible alarm may sound via the speaker S, the tactile device 48 may be activated, and/or a text message may be presented via the display screen 14 alerting the operator 40 that an incorrect bin was accessed. The same display screen 14 and/or the optional prompting lamps 25 may be used to cue the operator 40 to the correct/expected component bin 22.

Referring to FIG. 4, an example method 100 is described for using the system 50 shown in FIGS. 1 and 2. Prior to executing the method 100, the workstation 10 of FIGS. 1 and 2 is fully stocked with the necessary components or parts, such that the component bins 22 contain an adequate supply of the required components for completing the calibrated sequence 45. At step 102, the process controller 12 transmits the output signal (arrow $CC_{OUT}$) to the display screen 14 to thereby prompt the operator 40 as to the correct or "expected" component bin 22 or task step, e.g., "select component A from bin 1". The method 100 then proceeds to step 104.

Step 104 includes detecting the 2D coordinates of any broken light beams 32. This portion of the method 100 determines when the operator 40 is reaching a hand 42 toward the component bins 22. The 2D dimensions of the broken light beam(s) 32 in the plane 32P are received by the process controller 12, which then executes step 106.

At step 106, the process controller 12 determines whether the detected 2D coordinates from step 104 correspond to the coordinates of the expected component bin 22. Step 106 may entail comparing the 2D coordinates of the beam breakage to coordinated defining the boundaries of the expected component bin 22, with the expected component bin 22 being determined by the calibrated sequence 45. For example, if the calibrated sequence 45 calls for the operator 40 to pick a component from bin 1 of FIG. 1, the process controller 12 is programmed beforehand with the 2D boundaries for bin 1. Step 106 in this instance could entail determining whether the 2D coordinates fall within the 23 boundaries for bin 1, e.g., via a simple direct comparison. The method 100 proceeds to step 108 if the 2D coordinates do not fall within the boundaries for the corresponding expected component bin 22. The method 100 otherwise proceeds to step 114.

At step 108, the process controller 20 may optionally determine whether the location of the breakage from step 104, while outside of the corresponding boundaries for the component bin 22, still lies within a calibrated range of those boundaries, for instance within a couple of centimeters, indicating that the operator 40 is close to the correct bin 22, but slightly off target with the expected approach to the bin 22. If this is the case, the method 100 proceeds to step 110. Otherwise, the method 100 proceeds to step 112.

Step 110 entails executing a suitable control action, for instance illuminating state lamp $L_2$ of FIG. 1. As noted above, the state lamp $L_2$ may be an amber colored lamp in an example embodiment, or may have some other hue indicating that the operator 40 is close but not quite on target with respect to the expected component bin 22. An audible warning tone may be sounded via the speaker S, and/or a message may be displayed via the display screen 14 to provide feedback to the operator 40. Part of step 110 may entail illuminating the optional prompting lamp 25 on an expected component bin 22. The method 100 then proceeds to step 102.

At step 112, which is arrived at if the operator 40 misses the expected component bin 22 entirely, the process controller 12 may execute another suitable control action, for instance illuminating the state lamp $L_3$ of FIG. 1. As noted above, state lamp $L_3$ may be a red lamp in an example embodiment, or it may have some other color indicating that the operator 40 is not quite on target with respect to the expected component bin 22. A warning tone may be sounded via the speaker S as part of step 112, and/or a prompting text message may be displayed via the display screen 14 and/or one of the optional prompting lamps 25 as in step 110. The method 100 then proceeds to step 102.

Step 114 entails executing a suitable control action indicating that the result of step 106 is a correctly located component bin 22. Step 114 may include illuminating the state lamp $L_1$ of FIG. 1, for instance a green lamp or a lamp with an appropriate color indicating that the operator 40 is on target with respect to the expected component bin 22. A confirming audible tone may be sounded via the speaker S as part of step 114, and/or a confirming text message may be displayed via the display screen 14 as in step 110. The method 100 then proceeds to step 116.

At step 116, the process controller 12 increments a process step (N) in the calibrated sequence 45 and returns to step 102. For example, if the calibrated sequence 45 has five steps (N=5), the process controller 12 remains at step 1 in the calibrated sequence 45 until a determination is made at step 106 that the operator 40 has correctly located the expected component bin 22 for step 1, at which point the process controller 12 proceeds to step 2, with subsequent execution of step 102 starting with step 2 in this example.

While the best modes for carrying out the invention have been described in detail, those familiar with the art to which this invention relates will recognize various alternative designs and embodiments for practicing the invention within the scope of the appended claims.

The invention claimed is:

1. A position control system for a manual picking workstation having a plurality of component bins, comprising:
    a light device operable to project a light beam in a fixed plane between an operator and the plurality of component bins, wherein the fixed plane is divided into a virtual grid in which each segment or pixel of the grid has a corresponding two-dimensional (2D) coordinate pair; and
    a process controller in communication with the light device, wherein the process controller includes a processor and memory containing a calibrated assembly sequence and predetermined bin coordinates for each of the plurality of component bins, and is programmed to:
        detect, via the light device, an instance of beam breakage wherein the light beam is interrupted or broken;
        determine 2D coordinates of the beam breakage as one of the 2D coordinate pairs;
        determine corresponding 2D bin coordinates of an expected bin via the calibrated assembly sequence;
        compare the determined 2D coordinates of the beam breakage to the corresponding 2D bin coordinates of the expected bin; and
        execute a control action with respect to the manual picking workstation when the determined 2D coordinates of the beam breakage do not match the corresponding bin coordinates of the expected bin.

2. The system of claim 1, wherein the light source includes a laser scanner that continuously oscillates the light beam within the plane.

3. The system of claim 1, wherein the light source includes a plurality of stationary laser projectors that project the light beam as a plurality of light beams through the plane.

4. The system of claim 1, further comprising an indicator device in communication with the process controller, wherein the process controller is further programmed to selectively activate the indicator device as the control action.

5. The system of claim 4, wherein the indicator device includes a plurality of lamps each having a different color, and wherein the control action is an illumination of one of the plurality of lamps.

6. The system of claim 4, wherein the indicator device includes a speaker, and wherein the control action is a broadcast of an audible tone via the speaker.

7. The system of claim 1, further comprising a display screen, wherein the control action includes a presentation of a text message via the display screen.

8. The system of claim 7, further comprising an indicator device in communication with the process controller, wherein the process controller is further programmed to activate the indicator device as the additional control action.

9. The system of claim 8, wherein the indicator device includes a tactile device that vibrates as the additional control action.

10. The system of claim 1, wherein each of the component bins includes a prompting lamp, and wherein the process controller selectively activates one of the prompting lamps as part of the control action.

11. A position control system for a manual picking workstation having a plurality of component bins, comprising:
    a laser scanner operable to continuously oscillate a light beam along a fixed plane between an operator and the plurality of component bins, wherein the fixed plane is divided into a virtual grid in which each segment or pixel of the grid has a corresponding two-dimensional (2D) coordinate pair;
    a display screen;
    an indicator device; and
    a process controller in communication with the laser scanner, the display screen, and the indicator device, wherein the process controller includes a processor and memory containing a calibrated assembly sequence and predetermined bin coordinates for each of the plurality of component bins, and is programmed to:
        detect, via the laser scanner, an instance of beam breakage wherein the oscillating light beam is interrupted or broken;
        determine two-dimensional (2D) coordinates of the beam breakage as one of the 2D coordinate pairs;
        determine corresponding 2D bin coordinates of an expected bin via the calibrated assembly sequence;
        compare the determined 2D coordinates of the beam breakage to the corresponding 2D bin coordinates of the expected bin; and
        execute a control action with respect to the manual picking workstation when the determined 2D coordinates of the beam breakage do not match the corresponding bin coordinates of the expected bin, including displaying a text message on the display screen and activating the indicator device.

12. The system of claim 11, wherein the indicator device includes a plurality of lamps each having a different color, and wherein the control action is an illumination of one of the plurality of lamps.

13. The system of claim 11, wherein the indicator device includes a speaker, and wherein the control action is a broadcast of an audible tone via the speaker.

14. The system of claim 11, wherein the indicator device includes a tactile device, and wherein the process controller is programmed to activate the tactile device as part of the control action.

15. The system of claim 11, wherein each of the component bins includes a prompting lamp, and wherein the process controller selectively activates one of the prompting lamps as part of the control action.

16. A method for controlling a position control system for a manual picking workstation having a plurality of component bins, the method comprising:
    providing a calibrated assembly sequence and predetermined two-dimensional (2D) bin coordinates for each of the plurality of component bins;

projecting a light beam along a fixed plane between an operator and the plurality of component bins via a light device;

dividing the fixed plane into a virtual grid in which each segment or pixel of the virtual grid has a corresponding 2D coordinate pair;

detecting, via a process controller and the light device, an instance of beam breakage wherein the light beam is interrupted or broken;

detecting 2D coordinates of the beam breakage as one of the 2D coordinate pairs;

determining corresponding bin coordinates of an expected bin via the calibrated assembly sequence;

comparing the determined 2D coordinates of the beam breakage to the corresponding bin coordinates of the expected bin via the process controller; and executing a control action with respect to the manual picking workstation via the process controller when the determined 2D coordinates of the beam breakage do not match the corresponding bin coordinates of the expected bin.

17. The method of claim 16, wherein the light source includes a laser scanner, and wherein projecting a light beam includes continuously oscillating the light beam in the plane.

18. The method of claim 16, wherein the light source includes a plurality of stationary laser projectors, and wherein projecting the light beam includes projecting a plurality of light beams in the plane.

19. The method of claim 16, wherein executing the control action includes selectively activating an indicator device as the control action.

20. The method of claim 16, wherein executing the control action includes at least one of activating a prompting lamp on one of the component bins and activating a tactile device to cause the tactile device to vibrate.

* * * * *